United States Patent [19]

Ogawa et al.

[11] 4,197,347
[45] Apr. 8, 1980

[54] HIGH DENSITY MAGNETIC RECORDING MEDIA

[75] Inventors: Hiroshi Ogawa; Yasuo Tamai; Matsuaki Nakamura, all of Odawara, Japan

[73] Assignee: Fuji Photo Film Co., Ltd., Minami Ashigara, Japan

[21] Appl. No.: 926,069

[22] Filed: Jul. 19, 1978

[30] Foreign Application Priority Data

Jul. 22, 1977 [JP] Japan .................................. 52-87994

[51] Int. Cl.$^2$ ............................................. H01F 1/04
[52] U.S. Cl. .............................. 428/328; 75/0.5 BA;
148/105; 252/62.55; 360/134; 360/135;
360/136; 427/128; 427/216; 428/329; 428/336;
428/339; 428/539; 428/900

[58] Field of Search ............... 428/539, 900, 378, 329,
428/336, 338, 339, 538; 360/134, 135, 136;
423/633, 634; 148/105, 31.57; 7 5/0.5 BA;
252/62.55; 427/128, 216, 127

[56] References Cited

U.S. PATENT DOCUMENTS 4,063,000  12/1977  Aonuma et al. .................... 428/900

Primary Examiner—Stanley S. Silverman
Attorney, Agent, or Firm—Sughrue, Rothwell, Mion, Zinn and Macpeak

[57] ABSTRACT

A magnetic recording medium comprising a nonmagnetic support having thereon a magnetic recording layer of a ferromagnetic powder dispersed in a binder, wherein the ferromagnetic powder is a low vacuum evaporation process ferromagnetic metal powder subjected to a surface oxidation stabilizing processing and the low vacuum evaporation process ferromagnetic metal powder is one processed with an aqueous solution containing at least one anionic surface active agent.

19 Claims, 1 Drawing Figure

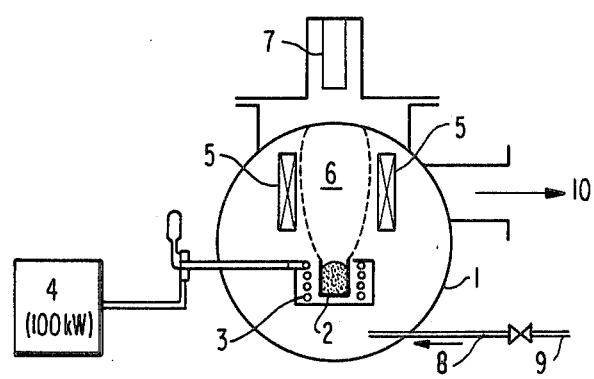

HIGH DENSITY MAGNETIC RECORDING MEDIA

BACKGROUND OF THE INVENTION

1. Field of the Invention

The present invention relates to magnetic recording media and, particularly, it relates to magnetic coating solutions having an excellent dispersibility and to high density magentic recording media having excellent surface properties, storage stability and a high reproduction output.

2. Description of the Prior Art

Hitherto, as magnetic recording media, for example, video tapes, etc., those which are produced by blending and dispersing a metal oxide powder such as $\gamma$-$Fe_2O_3$, Co-containing $\gamma$-$Fe_2O_3$, $Fe_3O_4$, Co-containing $Fe_3O_4$ or $CrO_2$, etc., as a ferromagnetic material in a binder, applying the resulting dispersion to a nonmagnetic flexible support and drying the layer have been used.

Although the recording wavelength in these video tapes is about 2 $\mu$m in cases of small-sized VTR's, recently use of even shorter recording wavelengths has been required so as to increase the recording density.

However, in magnetic recording media using a metal oxide, a high reproduction output cannot be obtained when the recording wavelength is short because they have a low residual magnetic flux density (Br) and a low coercive force (Hc).

Therefore, development of a process for obtaining magnetic recording media having a high Br and Hc has been investigated. The following processes for producing ferromagnetic metal powders are known.

(1) A process which comprises reducing an oxalate of a metal capable of producing a ferromagnetic material in a hydrogen stream at a high temperature (e.g., as disclosed in Japanese Patent Publication Nos. 11412/61, 22230/61, 14809/63, 8027/65, 14318/66, 22394/68 and 38417/72).

(2) A process which comprises reducing goethite or needle-like $\gamma$-$Fe_2O_3$ in a hydrogen stream at a high temperature (e.g., as disclosed in Japanese Patent Publication Nos. 3862/60, 20939/64 and 39477/72, U.S. Pat. Nos. 3,598,568, 3,607,220 and 3,681,018, British Pat. No. 1,192,167 and German Patent Application (DT-OS) No. 2,130,921).

(3) A process which comprises evaporating a ferromagnetic metal in an inert gas followed by condensation (e.g., as disclosed in Japanese Patent Publication Nos. 25620/71 and 27718/72 and Japanese Patent Application (OPI) Nos. 25662-25665/73 and 55400/73 (The term "OPI" as used herein refers to a "published unexamined Japanese patent application")).

(4) A process which comprises decomposing a carbonyl compound of a metal capable of producing a ferromagnetic material (e.g., as disclosed in Japanese Patent Publication Nos. 128/63 and 3415/65 and U.S. Pat. Nos. 2,983,997, 3,172,776, 3,200,007 and 3,228,882).

(5) A process which comprises electrodepositing a ferromagnetic metal in mercury using a mercury cathode and separating the mercury therefrom by heating (e.g., as disclosed in Japanese Patent Publication Nos. 787/64, 15525/64 and 8123/65 and U.S. Pat. No. 3,156,650).

(6) A process which comprises reducing a salt of a metal capable of producing a ferromagnetic material in an aqueous solution with using a reducing agent (e.g., boron hydride compounds, hypophosphites or hydrazine, etc.) to obtain a ferromagnetic powder (e.g., as disclosed in Japanese Patent Publication Nos. 26555/63, 4567/66, 4769/66, 20116/68, 16052/72 and 41718/72, Japanese Patent Application (OPI) Nos. 1353/72 and 41718/72 and U.S. Pat. Nos. 3,206,338, 3,494,760, 3,535,104, 3,567,525, 3,661,556, 3,663,318, 3,700,499, 3,943,012, 3,966,510, 4,007,072, 4,009,111 and 4,020,236).

Of the above-described processes, a finely divided powder having magnetic characteristics of a coercive force of more than 600 Oe and a maximum magnetization of more than 100 emu/g wherein several finely divided particles having a particle size of about 200 Å are connected in a chain can be easily obtained by the low vacuum evaporation process (3). However, the resulting low vacuum evaporation process ferromagnetic metal powder has a high activity itself and often ignites forming an oxide having very poor magnetic characteristics when the powder is allowed to stand in the air. Accordingly, difficulties arise because the powder should be handled in a vacuum or in an inert gas until the powder is mixed with a binder or a solvent in order to produce a magnetic coating composition. Further, since the resulting magnetic coating composition has poor dispersibility, the saturation magnetic flux density of the magnetic recording medium obtained by coating this composition on a nonmagnetic support and drying the coating decreases due to oxidation of the magnetic material at high temperature and high humidity and, consequently, the magnetic recording medium has a poor storage stability. Therefore, a process which comprises deactivating the surface of the ferromagnetic metal by oxidation has been proposed. A process which comprises mixing the formed ferromagnetic metal powder with an organic solvent and oxidizing the surface layer by drying the mixture in the air to remove the organic solvent and a process which comprises mixing a formed ferromagnetic metal powder with an organic solvent, drying the mixture in an inert gas to remove the organic solvent and oxidizing the surface by supplying air slowly thereto are known, as described in U.S. Pat. Nos. 3,206,338 and 3,663,318, as surface oxidation stabilizing processings. However, when these processes are applied to the low vacuum evaporation process, the resulting magnetic coating composition has poor dispersibility and the storage stability of the magnetic recording medium obtained by coating such a composition on a nonmagnetic support and drying the coating is not sufficient.

SUMMARY OF THE INVENTION

Accordingly, as a result of studies in order to provide magnetic recording media which do not have the defects described above, it has now been found out that a good result is obtained, if a low vacuum evaporation process ferromagnetic metal powder which has been subjected to the above-described surface stabilizing processing and which has been processed with an aqueous solution containing at least one anionic surface active agent is used as the ferromagnetic powder in a magnetic recording layer of a magnetic recording medium, and, thus, the present invention has been attained.

A first object of the present invention is to provide novel magnetic recording media.

A second object of the invention is to provide a low vacuum evaporation ferromagnetic metal powder having excellent stability and dispersibility.

A third object of the invention is to provide magnetic recording media having a high residual magnetic flux density (Br), a high coercive force (Hc) and a large squareness ratio (Br/Bm).

A fourth object of the invention is to provide magnetic recording media having a high output, a low noise and excellent durability.

The present invention provides a magnetic recording medium comprising a nonmagnetic support having thereon a magnetic recording layer comprising a ferromagnetic powder dispersed in a binder wherein the ferromagnetic powder is a low vacuum evaporation process ferromagnetic metal powder which has been subjected to a surface oxidation stabilizing processing and which has been processed with an aqueous solution containing at least one anionic surface active agent.

BRIEF DESCRIPTION OF THE DRAWING

The FIGURE is a schematic of an apparatus for producing a ferromagnetic metal powder using a low vacuum evaporation process in which an induction furnace is used.

DETAILED DESCRIPTION OF THE INVENTION

The low vacuum evaporation process ferromagnetic metal powder used in the present invention means a ferromagnetic metal powder which is prepared by heating a ferromagnetic metal, an alloy of ferromagnetic metals or an alloy of ferromagnetic metals and nonmagnetic metals in an inert gas to evaporate the metal under low vacuum conditions and condensing the metal thereafter.

The inert gas used in the present invention means a nonoxidizing gas such as helium, nitrogen, argon or neon, etc. These inert gases may also contain a small amount of oxygen (e.g., less than 0.1% of the partial gaseous pressure based on the total gaseous pressure of the gas used).

The pressure of the inert gas can range from about 0.05 to 300 mm Hg and preferably is 0.1 to 50 mm Hg and the temperature of the inert gas can range from about $-20°$ C. to $60°$ C. and preferably is $0°$ C. to $30°$ C.

Examples of ferromagnetic metals which can be used in the present invention are iron, cobalt, nickel, gadolinium, terbium or dysprosium, and iron, cobalt and nickel are preferred. The amount of these ferromagnetic metals in the ferromagnetic metal is above about 80% by weight and preferably is above 95% by weight.

Suitable nonmagnetic metals which can be used in the present invention are zinc, aluminum, copper, tin, manganese, chromium or molybdenum. The amount of these nonmagnetic metals in the ferromagnetic metal is below about 20% by weight and preferably is below 5% by weight.

A plasma jet, an electron beam or a high frequency induction furnace can be effectively used to heat and vaporize the ferromagnetic metal. However, a high frequency induction furnace is particularly preferred from an economical standpoint.

A high-frequency furnace is preferred because of high energy efficiency. A frequency range of about 100 KHz to about 1,000 KHz is preferred and a range of 400 KHz to 500 KHz is particularly preferred for the high frequency induction furnace. An output for the high-frequency generator of above about 10 kw is preferred and an output above 50 kw is particularly preferred. A low output is not preferred, because the temperature of the furnace does not increase.

The temperature of the furnace at evaporation can range from above about $1,600°$ C. to the heat resistant critical point of the above-described induction furnace (about $2,300°$ C. at present), but a range of $1,600°$ to $1,800°$ C. is preferred.

The FIGURE shows a schematic of an apparatus for producing a ferromagnetic metal powder using a low vacuum evaporation process in which a high frequency induction furnace is used. In the FIG., 1 is a high frequency induction furnace, 2 is a crucible containing starting material, 3 is a high-frequency induction coil, 4 is a high-frequency power supply, 5 is a magnetic orientation apparatus, 6 is ultra-fine powder-like particles, 7 is a collector. 8 is an inert gas, 9 is an inert gas inlet and 10 is a vacuum pump system.

The particle size of the low vacuum evaporation process ferromagnetic metal obtained using this apparatus can be suitably varied in the range from about 50 Å to 1,000 Å by changing the kind and pressure of the inert gas introduced into the furnace.

A particle size range of 100 to 300 Å is preferred, because the resulting particles have a high coercive force. A particle size which is too small is not preferred, because the resulting particles have poor stability and are easily oxidized. Too large a particle size is not preferred, because a high coercive force is not obtained, although the stability is improved.

It is preferred for a magnetic field of about 100 Oe or more, and preferably in the range of 500 Oe to 5,000 Oe, to be applied during condensation of the metal vapor, because finely divided particles combine together and the magnetic field orientation is increased.

Hereinafter, for simplicity, the term ferromagnetic metal powder will be used to describe ferromagnetic metal powders, ferromagnetic metal alloy powders and powders of alloys of ferromagnetic metals and nonmagnetic metals.

The surface oxidation stabilizing processing suitable for the present invention comprises treating the low vacuum evaporation process ferromagnetic metal powder formed in the inert gas with an apparent specific gravity of about 1.0 g/cm$^3$ or less and preferably 0.5 g/cm$^3$ or less by introducing air into the low vacuum evaporating furnace at a rate of below about 10 mm Hg/minute and preferably below 5 mm Hg/minute to restore the pressure in the furnace to atmospheric pressure by which a very thin oxidation layer is formed on the surface of the ferromagnetic metal particles. A suitable temperature is about $-20°$ C. to about $60°$ C. and preferably $0°$ C. to $30°$ C. If the apparent specific gravity is above about 1.0 g/cm$^3$, the saturation magnetization of the resulting low vacuum evaporation process ferromagnetic metal powder becomes small, because the surface oxidation stabilizing processing cannot be carried out uniformly. If the feed rate of the air is above about 10 mm Hg/minute, saturation magnetization decreases because the ferromagnetic metal powder is oxidized. The thickness of the above-described oxidation layer preferably is 5% or less of the particle size of the low vacuum evaporation process ferromagnetic metal powder. For example, if the particle size is about 200 Å, the oxidation layer has a thickness of 10 Å or less.

Suitable anionic surface active agents which can be used in the present invention are materials having a carboxylic acid salt group, a sulfuric acid ester salt group, a phosphoric acid ester salt group, a dithiophosphoric acid ester salt group or a sulfonic acid salt group, etc., as a hydrophilic group. Suitable salts are ammonium salts or alkali metal salts (e.g., Li, Na or K, etc.). Further, aliphatic acids can be used too, although they are not surface active agents in the traditional sense.

Examples of suitable surface active agents include the following compounds.

Suitable carboxylic acid salt type surface active agents are aliphatic acid salts having 6 to 32 carbon atoms.

Suitable sulfuric acid ester salt type surface active agents are sulfuric acid ester salts of higher alcohols having 6 to 18 carbon atoms, sulfuric acid ester salts of aliphatic acids having 6 to 32 carbon atoms, sulfuric acid ester salts of aliphatic acid esters having an alkyl moiety of 1 to 4 carbon atoms as a substituent, sulfuric acid ester salts of polyoxyethylene alkyl ethers (e.g., of the formula R—(C$_2$H$_4$O)$_{\overline{n}}$OSO$_3$—, wherein R represents an alkyl group having 8 to 18 carbon atoms and n is $1 \leq n \leq 6$), sulfuric acid ester salts of polyoxyethylene phenyl ethers (e.g., of the formula

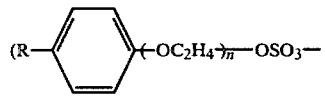

wherein R and n are as defined above), sulfuric acid ester salts of oils or paraffins and sulfonated olefins having 12 to 18 carbon atoms.

Suitable sulfonic acid salt type surface active agents are alkylaryl sulfonic acid salts, amido group containing alkylaryl sulfonic acid salts, ether group containing alkylaryl sulfonic acid salts, ester group containing alkylaryl sulfonic acid salts, α-olefin sulfonic acid salts, ether group containing sulfonic acid salts, amido group containing sulfonic acid salts and ester group containing sulfonates, etc.

Suitable phosphoric acid ester salt type surface active agents are phosphoric acid monoester salts of higher alcohols having 6 to 18 carbon atoms, phosphoric acid diester salts and phosphoric acid ester salts of compounds comprising the ethylene oxide adducts of higher alcohols having 6 to 18 carbon atoms.

Suitable dithiophosphoric acid ester salts are dialkyl dithiophosphoric acid ester salts (including zinc salts).

Specific examples of suitable surface active agents include aliphatic acid salts having 6 to 32 carbon atoms, such as sodium caproate, potassium enanthate, sodium caprylate, sodium pelargonate, ammonium pelargonate, sodium caprate, sodium undecylate, potassium undecylenate, sodium laurate, ammonium laurate, potassium lauroleate, sodium tridecanoate, sodium myristate, potassium myristate, ammonium myristate, sodium 4-tetradecenate, ammonium 4-tetradecenate, sodium pentadecanoate, sodium palmitate, ammonium palmitate, sodium zoomarate, ammonium zoomarate, sodium margarate, ammonium margarate, sodium stearate, potassium stearate, ammonium stearate, sodium petroselinate, lithium oleate, sodium oleate, potassium oleate, ammonium oleate, sodium elaidate, potassium elaidate, ammonium elaidate, sodium ricinoleate, potassium ricinoleate, sodium linolate, potassium eleostearate, sodium linolenate, potassium linolenate, sodium parinarate, potassium parinarate, sodium nonadecanoate, ammonium nonadecanoate, sodium arachidate, ammonium arachidate, sodium arachidonate, potassium arachidonate, sodium gadoleate, ammonium gadoleate, sodium heneicosanoate, sodium behenate, potassium behenate, ammonium behenate, sodium erucate, potassium erucate, ammonium erucate, sodium brassidate, ammonium brassidate, sodium lignocerate, potassium lignocerate, ammonium lignocerate, sodium cerotate, potassium cerotate, ammonium cerotate, sodium montanate, potassium montanate, ammonium montanate, sodium melissate, potassium melissate and ammonium melissate; alkylaryl sulfonic acid salts, such as sodium xylenesulfonate, sodium dodecylbenzenesulfonate, ammonium polybutylnaphthalenesulfonate, potassium isopropylnaphthalenesulfonate and sodium nonylbenzenesulfonate, etc.; sulfonic acid salts of alkylsuccinic acid esters, such as sodium N-octadecylsulfosuccinate, tetrasodium N-(1,2-dicarboxyethyl)-N-octadecyl-sulfosuccinate, diamyl sodium sulfosuccinate, dihexyl potassium sulfosuccinate, dioctyl sodium sulfosuccinate and sodium di-2-ethylhexyl sulfosuccinate, etc.; amido group containing sulfonic acid salts, such as sodium N-cyclohexyl-N-palmitoyl-taurate, sodium oleylmethyl-taurate and sodium N-methyl-N-oleyl-taurate, etc.; sulfonic acid salts of higher aliphatic acids having 6 to 18 carbon atoms, such as sodium oleyl alcohol sulfonate, potassium oleylcetyl alcohol sulfonate and sodium lauryl alcohol sulfonate, etc.; sulfuric acid esters of higher alcohols, such as ammonium oleyl cetyl sulfate and sodium octadecyl alcohol sulfate, etc.; sulfuric acid ester salts of oils or paraffins, such as sulfonated castor oil, sulfonated coconut monoglyceride, sulfonated glycerol monosulfonated pine oil and sulfonated cotton seed oil, etc.; ester group containing sulfuric acid esters such as sulfonated sodium salt of butyl ricinoleate, etc.; olefin group containing sulfuric acid ester salts, such as ammonium alkylphenoxy polyethylene ethanol sulfate, etc.; phosphoric acid ester salts, such as sodium monooleyl phosphate and sodium dodecyl phosphate, etc.; and pentasodium diethylenetriamine pentaacetate and sodium oleylstearylisothionate, etc.

Many commercially available detergents contain anionic surface active agents as main components, containing one or more anionic surface active agents with a builder being added. In the present invention, mixtures which contain additives, such as a builder may be used, if they contain at least one anionic surface active agent.

Preferred anionic surface active agents for use in the present invention are aliphatic acid salts having 11 to 22 carbon atoms. Unsaturated aliphatic acid salts (for example, oleate salts) are more preferred than saturated aliphatic acid salts (for example, stearate salts), because they are more effective. The alkali metal salts and, particularly, the sodium salts and potassium salts, are preferred as aliphatic acid salts.

Particularly preferred salts are alkali metal salts of aliphatic acids. More specifically, saturated or unsaturated aliphatic acid salts having 12 to 18 carbon atoms are preferred. Sodium oleate and sodium stearate are most preferred.

At least one of the above-described anionic surface active agents is used in the form of an aqueous solution thereof.

The aqueous solution which can be used in the present invention includes water or a mixture of water and polar organic solvents miscible completely or partially with water (but with the amount of water being more than about 50% by weight). Examples of suitable polar organic solvents include methyl alcohol, ethyl alcohol, isopropyl alcohol, acetone, methyl ethyl ketone, dimethyl sulfoxide, dimethylformamide, tetrahydrofuran and dioxane.

A suitable concentration of the anionic surface active agent in the aqueous solution is above about 0.03 wt% and preferably above 0.1 wt%. If the concentration is below about 0.03%, efficiency becomes very low and an antioxidation effect is difficult to obtain on the ferromagnetic metal powder. Further, the total amount of anionic surface active agent to the amount of the ferromagnetic metal powder is in a range of about 0.1 to about 10% by weight and preferably 2 to 5% by weight. If the amount is less than about 0.1% by weight, the surface processing effect due to the anionic surface active agent becomes low. If the amount is more than about 10% by weight, an excess of the surface active agent remains after the processing. It is believed that a sufficient effect can be obtained if the anionic surface active agent is adsorbed on the surface of the ferromagnetic metal particles to an extent of a thickness of 1 or 2 molecules.

Further, where the ferromagnetic metal powder is processed with an aqueous solution of an anionic surface active agent, it is preferred to use water which does not contain impurities, but the water to be used for the treatment of the anionic surface active agent does not necessarily need to be pure and may be water for industrial use.

Further, the pH of the aqueous solution preferably ranges from about 3 to about 9. If the pH is less than about 3, the ferromagnetic metal powder easily dissolves into the solution. If the pH is more than about 9, precipitates such as hydroxides easily form, with the result that it is difficult to separate the ferromagnetic metal powder therefrom.

In the present invention, the low vacuum evaporation process ferromagnetic metal powder obtained by the abovedescribed process is washed with an aqueous solution containing, for example, sodium oleate, by which the sodium oleate is adsorbed on the surface of the ferromagnetic metal powder. Uniform dispersion of the particles of the ferromagnetic metal powder during washing is important. Dispersion is carried out using a ball mill, a pebble mill, a trommel, a sand grinder, an attritor, an impeller dispersing machine, a high-speed mixer, a high-speed stone mill, a high-speed impeller, a homogenizer or an ultrasonic dispersing machine, etc. The washing can be carried out at about 0° C. to about 90° C. for about 3 seconds to about 20 minutes. After that, excess sodium oleate is removed directly or by washing with water.

The processed ferromagnetic metal powder is then dried in nitrogen or an inert gas or in the air, or is mixed with an organic solvent.

The resulting ferromagnetic metal powder is mixed with a binder to produce a magnetic coating composition. The magnetic coating composition is coated on a nonmagnetic support and dried to produce magnetic recording media which are used in the shape of a tape, a disk, a sheet or a card.

Processes which can be used for producing magnetic coating compositions are described in detail in Japanese Patent Publication Nos. 15/60, 26794/64, 186/68, 28043/72, 28045/72, 28046/72, 28048/72, 31445/72, 11162/73, 21331/73 and 33683/73 and U.S.S.R. Patent No. 308,033. The magnetic coating compositions described in these patents contain a ferromagnetic material, a binder and a coating aid as main components and sometimes other additives such as a dispersing agent, a lubricating agent, an abrasive or an antistatic agent, etc., are present.

Thermoplastic resins, thermosetting resins, reactive resins, and mixtures of these resins can be used as binders in this invention.

Suitable thermoplastic resins which can be used as binders in this invention are resins having a softening point of lower than about 150° C., a mean molecular weight of about 10,000 to 200,000, and a degree of polymerization of about 200 to 2,000. Specific examples of suitable resins are vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid esterstyrene copolymers, methacrylic acid ester-acrylonitrile copolymers, methacrylic acid ester-vinylidene chloride copolymers, methacrylic acid ester-styrene copolymers, urethane elastomers, polyvinyl fluoride, vinylidene chlorideacrylonitrile copolymers, butadiene-acrylonitrile copolymers, polyamide resins, polyvinyl butyral, cellulose derivatives (e.g., cellulose acetate butyrate, cellulose diacetate, cellulose triacetate, cellulose propionate, nitrocellulose, etc.), styrene-butadiene copolymers, polyester resins, various synthetic rubber type thermoplastic resins (e.g., polybutadiene, polychloroprene, polyisoprene, styrene-butadiene copolymers, etc.), and mixtures thereof.

These thermoplastic resins are described in detail in, for example, Japanese Patent Publication Nos. 6877/62, 12528/64, 19282/64, 5349/65, 20907/65, 9463/66, 14059/66, 16985/66, 6248/67, 11621/67, 4623/68, 15206/68, 2889/69, 17947/69, 18232/68, 14020/70, 14500/70, 18573/72, 22063/72, 22064/72, 22068/72, 22069/72, 22070/72 and 27886/73 and U.S. Pat. Nos. 3,144,352, 3,419,420, 3,499,789 and 3,713,887.

Suitable thermosetting resins or reactive resins which can be used in this invention are those having a molecular weight of less than 200,000 as a coating liquid composition and after coating and drying, the molecular weight of the resin becomes substantially infinite due to condensation reactions, addition reactions, etc., occurring. Also, resins which are not softened or melted before the resins are decomposed are preferred. Specific examples of these resins are phenol/formaldehyde novolak resins, phenol/formaldehyde resole resins, phenol/furfural resins, xylene/formaldehyde resins, urea resins, melamine resins, drying oil-modified alkyd resins, carbolic acid resin-modified alkyd resins, maleic acid resin-modified alkyd resins, unsaturated polyester resins, a mixture of an epoxy resin and a hardening agent (e.g., a polyamine, an acid anhydride, a polyamide resin, etc.), terminal isocyanate polyester moisture-hardenable type resins, terminal isocyanate polyether moisture-hardenable type resins, polyisocyanate prepolymers (compounds having at least three isocyanate groups in one molecule obtained by reaction of a diisocyanate and a low molecular weight triol, trimers and tetramers of diisocyanates), a resin of a polyisocyanate prepolymer and an active hydrogen containing compound (e.g., a polyester polyol, a polyether polyol, an acrylic acid copolymer, a maleic acid copolymer, a 2-hydroxyethyl methacrylate copolymer, a p-hydroxystyrene copolymer, etc.), and mixtures thereof.

These resins are described in detail in, for example, Japanese Patent Publication Nos. 8103/64, 9779/65, 7192/66, 8016/66, 14275/66, 18179/67, 12081/63, 28023/69, 14501/70, 24902/70, 13103/71, 22065/72, 22066/72, 22067/72, 22072/72, 22073/72, 28045/72, 28048/72, 28922/72 and U.S. Pat. Nos. 3,144,353, 3,320,090, 3,437,510, 3,597,273, 3,781,210 and 3,781,211.

These binders may be used individually or as a combination thereof and, further, as the case may be, additives may be added to the binder. A suitable weight ratio of the ferromagnetic metal powder and the binder is in the range of about 10 to 400 parts by weight, preferably 10 to 200 parts by weight, of the binder to 100 parts by weight of the ferromagnetic metal powder.

The magnetic recording layer may further contain, in addition to the above-described binders, ferromagnetic metal powder, etc., additives such as dispersing agents, lubricants, abrasives, antistatic agents, etc.

The low vacuum evaporation process ferromagnetic metal powder according to the present invention has been already processed with the surface active agent in water, but it is preferred for a dispersing agent to be added thereto to produce a magnetic recording layer coating composition.

Examples of dispersing agents which can be used in this invention are fatty acids (e.g., of the formula $R_1COOR$, wherein $R_1$ is an alkyl or alkenyl group having 11 to 17 carbon atoms) having 12 to 18 carbon atoms, such as caprylic acid, capric acid, lauric acid, myristic acid, palmitic acid, stearic acid, oleic acid, elaidic acid, linoleic acid, linolenic acid, and stearolic acid; metal salts, i.e., alkali metal salts (e.g., Li salts, K salts, and Na salts, etc.) or the alkaline earth metal salts (Mg salts, Ca salts, Ba salts, etc.) of these fatty acids; the fluorine-containing esters of the above-described fatty acids; amides of the above-described fatty acids; polyalkylene oxide alkylphosphoric acid esters; lecithin; trialkyl polyalkyleneoxy quaternary ammonium salts (e.g., where the alkylene moiety has 1 to 5 carbon atoms, such as ethylene and propylene); and the like. Moreover, higher alcohols having 12 or more carbon atoms and the sulfuric acid esters thereof can also be used. A suitable amount of the dispersing agent is usually about 0.5 to 20 parts by weight per 100 parts by weight of the binder used.

These dispersing agents are specifically disclosed in, for example, Japanese Patent Publication Nos. 28369/64, 17945/69, 7441/73, 15001/73, 15002/73, 16363/73, and 4121/75 and U.S. Pat. Nos. 3,470,021 and 3,387,993.

Suitable lubricants which can be used in this invention include silicone oils such as dialkyl polysiloxanes (with the alkyl moiety having 1 to 3 carbon atoms), dialkoxypolysiloxanes (with the alkoxy moiety having 1 to 4 carbon atoms), monoalkylmonoalkoxypolysiloxanes (with the alkyl moiety having 1 to 5 carbon atoms and the alkoxy moiety having 1 to 4 carbon atoms), phenylpolysiloxanes, fluoroalkylpolysiloxanes (with the alkyl moiety having 1 to 5 carbon atoms), etc.; fine electrically conductive particles, such as graphite particles, etc.; fine inorganic particles such as molybdenum disulfide, tungsten disulfide, etc.; fine synthetic resin particles, such as polyethylene, polypropylene, ethylene-vinyl chloride copolymers, polytetrafluoroethylene, etc.; α-olefin polymers; unsaturated aliphatic hydrocarbons which are liquid at room temperature (compounds having n-olefin double bonds at the terminal carbon atoms, having about 18 to about 24 carbon atoms); and fatty acid esters comprising monocarboxylic fatty acids having 12 to 20 carbon atoms and monohydric alcohols having 3 to 12 carbon atoms. A suitable amount of these lubricants is usually about 0.2 to 20 parts by weight per 100 parts by weight of the binder.

These lubricants are disclosed in, for example, Japanese Patent Publication Nos. 23889/68, 40461/71, 15621/72, 18482/72, 28043/72, 30207/72, 32001/72, 7442/73, 14247/74 and 5042/75, U.S. Pat. Nos. 3,470,021, 3,492,235, 3,497,411, 3,523,086, 3,625,760, 3,630,772, 3,634,253, 3,642,539 and 3,687,725, *IBM Technical Disclosure Bulletin*, Vol. 9, No. 7, 779 (December 1966), and *Elektronik*, No. 12, 380 (1961).

Materials generally used as abrasives, such as fused alumina, silicon carbide, chromium oxide, corundum, artificial corundum, diamond, artificial diamond, garnet, emery, (main components: corundum and magnetite), etc., can be used as abrasives in this invention. These abrasives used in this invention have a Mohs' hardness of higher than about 5, and a mean particle size of about 0.05 to 5 microns, in particular, 0.1 to 2 microns. These abrasives are usually employed in an amount of about 0.5 to 20 parts by weight per 100 parts by weight of the binder used.

These abrasives are described in, for example, Japanese Patent Publication Nos. 18572/72, 15003/73, 15004/73 (or U.S. Pat. No. 3,617,378), 39402/74 and 9401/75, U.S. Pat. Nos. 3,007,807, 3,041,196, 3,293,066, 3,630,910, 3,687,725, British Pat. No. 1,145,349, West German Patent (DT-PS) Nos. 853,211 and 1,101,000.

Suitable antistatic agents which can be used in this invention are fine electrically conductive particles such as carbon black, carbon black graft polymers, etc.; natural surface active agents, such as saponin, etc.; nonionic surface active agents, such as alkylene oxide type surfactants, glycerin type surfactants, glycidol type surfactants, etc.; cationic surface active agents, such as higher alkylamines, quaternary ammonium salts, pyridine and other heterocyclic ring compounds, phosphoniums, sulfoniums, etc.; anionic surface active agents containing an acid group, such as a carboxylic acid group, a sulfonic acid group, a phosphoric acid group, a sulfuric acid ester group, a phosphoric acid ester group, etc.; and amphoteric surface active agents, such as amino acids, aminosulfonic acids, sulfuric acid esters or phosphoric acid esters of aminoalcohols, etc.

Examples of surface active agents which can be used as antistatic agents in this invention are disclosed in, for example, Japanese Patent Publication Nos. 22726/71, 24881/72, 26882/72, 15440/73 and 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, and British Pat. Nos. 1,077,317, and 1,198,450.

Furthermore, examples of suitable surface active agents are described in Ryohei Oda, et al., *Synthesis of Surface Active Agents and Applications Thereof*, Maki Shoten (1964), A. M. Schwartz & J. W. Perry, *Surface Active Agents*, Interscience Publications Incorporated (1958), J. P. Sisley, *Encyclopedia of Surface Active Agents*, Vol. 2, Chemical Publishing Company (1964), and *Kaimen Kasseizai Binran (Handbook of Surface Active Agents)*, 6th Edition, Sangyo Tosho K. K. (Dec. 20, 1966).

These surface active agents may be used individually or as a mixture thereof and they can be used for other purposes, such as for improving the dispersion and magnetic characteristics, improving the lubricating properties, and as a coating aid.

The magnetic recording layer of the present invention is formed by dispersing each of the above-described components in an organic solvent, kneading to disperse, applying the resulted coating solution to a nonmagnetic support and drying the coated layer. After coating of the magnetic recording layer, it is possible to carry out orientation of the ferromagnetic metal powder in the magnetic recording layer before it is dried. Further, it is possible to conduct a surface smoothing treatment of the magnetic recording layer after drying.

Suitable materials for the nonmagnetic supports used in this invention include polyesters, such as polyethylene terephthalate, polyethylene-2,6-naphthalate, etc.; polyolefins, such as polypropylene, etc.; cellulose derivatives, such as cellulose triacetate, cellulose diacetate, etc.; synthetic resins, such as polycarbonates, etc.; and nonmagnetic metals, such as aluminum, copper, zinc or alloys thereof, ceramics, such as glass, china, porcelain, etc.

Further, the nonmagnetic support may have any shape of a film, a tape, a sheet, a disc, a card and a drum, and various kinds of materials can be selected depending on the shape of the support as the occasion demands.

A suitable thickness of the nonmagnetic support is about 2 to about 50 $\mu$m and preferably 3 to 25 $\mu$m for films, tapes or sheets, and is about 0.5 to 10 mm for discs or cards. Where the shape is that of a drum, the shape is cylindrical and the size depends on the recorder to be used.

When the above-described support is used as the form of a film, a tape, a sheet, a thin flexible disc, etc., the opposite side of the support to the side having the magnetic recording layer thereon may be coated with a so-called back coat for the purpose of prevention of the generation of static charges, print through prevention, prevention of the occurrence of wow and flutter, etc.

Examples of back coat layers which can be employed in this invention are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 2,761,311.

The ferromagnetic metal powder is blended with the above-described binder, dispersing agent, lubricating agent, abrasive, antistatic agent and solvent to produce a magnetic coating composition.

In carrying out kneading, the ferromagnetic metal powder and each of the components described above are put in a kneading machine at the same time or separately. For example, a method which comprises adding a ferromagnetic metal powder to a solvent containing a dispersing agent and kneading the mixture for a prescribed period of time to produce a magnetic coating composition can be used.

Various kinds of kneading machines can be used for kneading and dispersing the magnetic coating composition. For example, a two-roll mill, a three-roll mill, a ball mill, a pebble mill, a sand grinder, a Szegvari attriter, a high-speed impeller, a high-speed stone mill, a high-speed impact mill, a homogenizer, an ultrasonic dispersing machine, etc.

Suitable techniques for kneading and dispersing which can be employed in this invention are described in T. C. Patton, *Paint Flow and Pigment Dispersion*, John Wiley & Sons Co. (1964) as well as in U.S. Pat. Nos. 2,581,414 and 2,855,156.

Air doctor coating, blade coating, air knife coating, squeeze coating, dip coating, reverse roll coating, transfer roll coating, gravure coating, cast coating, kiss coating, spray coating, etc., can be employed and, further, other coating methods may also be employed to coat the above-described magnetic recording layers on the support. Descriptions of these coating methods are described in detail in *Coating Kogaku (Coating Engineering)*, pages 253–277, Asakura Shoten (Mar. 20, 1971).

The magnetic recording media of the present invention are prepared by coating on nonmagnetic supports using the coating techniques described above to form a magnetic recording layer and drying the coating. Further, by repeating this step, two or more magnetic recording layers may be provided in a continuous coating operation. Further, as described in Japanese Patent Application Nos. 98803/73 (German Patent Application (DT-OS) 2,309,159) and 99233/73 (German Patent Publication (DT-AS) 2,309,158), two or more magnetic recording layers may be coated at the same time using a multilayer simultaneous coating method.

The above-described magnetic recording layer preferably has a dry thickness of about 2 to about 50 $\mu$m and more preferably 3 to 25 $\mu$m. Where two or more layers are present, it is preferred for the sum of the thickness of each layer to be in the above-described range.

Suitable organic solvents which can be used for coating the magnetic recording layers are ketones such as acetone, methyl ethyl ketone, methyl isobutyl ketone, cyclohexanone, etc.; alcohols, such as methanol, ethanol, propanol, butanol, etc.; esters, such as methyl acetate, ethyl acetate, butyl acetate, ethyl lactate, glycol acetate monoethyl ether, etc.; ethers and glycol ethers, such as diethyl ether, glycol dimethyl ether, glycol monoethyl ether, dioxane, etc.; aromatic hydrocarbons, such as benzene, toluene, xylene, etc.; and chlorinated hydrocarbons, such as methylene chloride, ethylene chloride, carbon tetrachloride, chloroform, ethylenechlorohydrin, dichlorobenzene, etc.

The magnetic recording layer formed on the support using the above-described method is, if desired, subjected to a treatment to orient the ferromagnetic metal powder as mentioned above, and then dried. Also, if desired, the magnetic recording layer is subjected to a surface smoothening treatment and, further, the magnetic recording medium thusformed is cut into the desired shape to provide the magnetic recording medium of this invention. In particular, it has further been found that by applying a surface smoothening treatment to the surface of the magnetic recording layer of this invention, a magnetic recording medium having a smooth surface and excellent abrasion resistance can be obtained.

The orientation magnetic field which can be used is an alternating current or direct current field of about 500 to 10,000 Oe. A suitable temperature for drying the magnetic layer is about 50° to about 120° C. and preferably 10° to 100° C. and particularly 80° to 90° C. A suitable supplying amount of air is about 1 to 5 kl/m$^2$ and preferably 2 to 3 kl/m$^2$. The drying time is generally about 30 seconds to about 10 minutes and preferably 1 to 5 minutes.

The orientation direction of the ferromagnetic metal powder particles is determined depending on the use of the magnetic recording medium. That is, in the case of an audio tape, a small-sized video tape, a memory tape, etc., the direction of the orientation is parallel to the lengthwise direction of the tape, while in the case of a broadcasting video tape, the magnetic recording tape is oriented at an angle of 30° to 90° to the lengthwise direction of the tape.

Orientation methods for ferromagnetic powder particles are described in, for example, U.S. Pat. Nos. 1,949,840, 2,796,359, 3,001,891, 3,172,776, 3,416,949, 3,473,960 and 3,681,138, and Japanese Patent Publication Nos. 3427/57, 28368/64, 23624/65, 23625/65, 13181/66, 13043/73 and 39722/73.

Further, orientation may be carried out in such a manner that the direction of orientation in an upper layer is different from that in a lower layer, as described in German Patent Publication (DT-AS) No. 1,190,985, where two or more magnetic recording layers are present.

The above-described surface smoothening treatment for each magnetic recording layer can be performed by calendering after drying or using a smoothening sheet before drying.

In calendering, it is preferred for the smoothening to be performed using a super calender method, wherein the magnetic recording tape is passed through two rolls, e.g., a metal roll and a cotton roll or a synthetic resin (e.g., nylon) roll. Super calender smoothening is preferably performed under the conditions of an inter roll pressure of about 25 to 50 kg/cm$^2$, a temperature of about 35° to 150° C., and a speed of 5 to 120 meters/min. If the temperature and the pressure are above the above-described upper limits, the magnetic recording layers and the nonmagnetic supports are adversely affected. Also, if the treatment speed is lower than about 5 meters/min, no surface smoothening effect is obtained and if the speed is higher than about 120 meters/m$^2$, no benefits due to the operation are observed.

These surface smoothening treatments are described in, for example, U.S. Pat. Nos. 2,688,567, 2,998,325 and 3,783,023, West German Patent Application (OLS) 2,405,222, and Japanese Patent Application (OPI) Nos. 53631/74 and 10337/75.

In the present invention, magnetic recording layers having excellent dispersibility which were not obtained from the prior low vacuum evaporation process ferromagnetic metal powder have been obtained by carrying out the surface oxidation stabilizing processing and by using saturated or unsaturated aliphatic acids having 10 to 22 carbon atoms in carrying out the dispersion. Consequently, magnetic recording media having a good surface property and a high reproducing output can be obtained. The saturation magnetic flux density of the resulting magnetic recording media decreases less and the resulting magnetic recording media have excellent storage stability even at high temperatures and high humidities.

The present invention is illustrative in greater detail below by reference to various examples. The low vacuum evaporation process ferromagnetic metal powder used in Examples A to E and Comparison Examples A to D was produced as follows.

A ferromagnetic alloy having a composition of Fe:-Ni=80:20 by weight was put in an airtight container equipped with a plasma gun, an air-core and a conical catcher. After the pressure in the container had been adjusted to 5 mm Hg using argon gas and the temperature was adjusted to 20° C., the container was heated by a plasma jet of the argon gas to evaporate the ferromagnetic alloy. A magnetic field of 500 Oe was applied using the air-core coil while the evaporated metal vapor was condensing and the condensate was collected by the catcher. Afer collection, air at 25° C. was introduced into the airtight container at the feed rate shown in Table 1 below and the condensate was taken out into the atmosphere. The saturation magnetization was then measured. The results are shown in Table 1 below. Further, saturation magnetization of the low vacuum evaporation process ferromagnetic alloy subjected to the surface oxidation stabilizing processing, where the apparent specific gravity had been varied, is shown in Table 2 below.

Table 1

| Example | Feed Rate (a) (mm Hg/min) | Apparent Specific Gravity (b) (g/cm$^3$) | Saturation Magnetization $\sigma$ s (c) (emu/g) |
|---|---|---|---|
| Example A | 2.5 | 0.3 | 125 |
| Example B | 5 | 0.3 | 125 |
| Example C | 10 | 0.3 | 105 |
| Comparison Example A | 25 | 0.4 | 40 |
| Comparison Example B | 50 | —* | 45 |

*Measurement not conducted, because a part of the sample burned.

Table 2

| Example | Feed Rate (a) (mm Hg/min) | Apparent Specific Gravity (b) (g/cm$^3$) | Saturation Magnetization $\sigma$ s (c) (emu/g) |
|---|---|---|---|
| Example C | 10 | 0.3 | 105 |
| Example D | 10 | 0.5 | 105 |
| Example E | 10 | 1.0 | 100 |
| Comparison Example C | 10 | 2.0 | 75 |
| Comparison Example D | 10 | 3.0 | 50 |

Examples 1 to 7 and Comparison Examples 1 to 6

Using the low vacuum evaporation process ferromagnetic alloy powder in Example B, surface processing was carried out in the manner shown below.

| | parts |
|---|---|
| Low Vacumm Evaporation Process Ferromagnetic Alloy Powder | 300 |
| Water | 10,000 |
| Surface Active Agent (kind and amount as shown in Table 3 and Table 4 below) | |

The above-described mixture was dispersed for 30 minutes using a high speed impeller. The aqueous solution of the surface active agent was then separated, and the ferromagnetic alloy powder was washed with 600 parts of acetone. After washing, the powder was dried in the atmosphere at 25° C.

After drying, the resulting low vacuum evaporation process ferromagnetic alloy powder was used for producing magnetic coating compositions and magnetic recording media in the manner described below.

| | parts |
|---|---|
| Low Vacuum Evaporation Process Ferromagnetic Alloy Powder | 300 |
| Polyester Polyurethane (which was synthesized substantially from ethylene adipate and 4,4'-diphenylmethane | 20 | agents were used are shown in Table 3. Comparison data where different amounts of surface active agents were used are shown in Table 4.

Table 3

| Sample | Surface Active Agent Kind | Amount (parts) | Surface Property (d) | Bm (e) (Gauss) | Br (f) (Gauss) | Squareness Ratio (g) (Br/Bm) | Coercive Force (h) (Oe) | Reproduction Output (i) (dB) | C/N (j) (dB) | Dust on Head (k) |
|---|---|---|---|---|---|---|---|---|---|---|
| Comparison Example 1 | — | 0 | 165 | 3,350 | 2,610 | 0.78 | 1,680 | 2.5 | −3.3 | Present |
| Example 1 | Sodium laurate | 20 | 230 | 4,280 | 3,600 | 0.84 | 1,820 | 7.0 | 2.1 | None |
| Example 2 | Sodium stearate | 20 | 235 | 4,310 | 3,660 | 0.85 | 1,830 | 7.5 | 2.6 | None |
| Example 3 | Sodium oleate | 20 | 245 | 4,460 | 3,840 | 0.86 | 1,830 | 9.2 | 3.8 | None |
| Example 4 | Sodium di-2-ethylhexyl-sulfosuccinate | 20 | 230 | 4,300 | 3,600 | 0.84 | 1,820 | 7.2 | 2.4 | None |
| Example 5 | Sodium dodecylbenzene-sulfonate | 20 | 210 | 3,970 | 3,300 | 0.83 | 1,800 | 6.4 | 1.5 | None |
| Comparison Example 2 | Polyoxyethylene oleyl ether (HLB: 11.4) | 20 | 170 | 3,390 | 2,600 | 0.77 | 1,710 | 3.1 | −2.8 | Present |
| Comparison Example 3 | Octadecylamine acetate | 20 | 185 | 3,480 | 2,750 | 0.79 | 1,730 | 3.8 | −0.5 | Slight amount |

Table 4

| Sample | Surface Active Agent Kind | Amount (parts) | Surface Property (d) | Bm (e) (Gauss) | Br (f) (Gauss) | Squareness Ratio (g) (Br/Bm) | Coercive Force (h) (Oe) | Reproduction Output (i) (dB) | C/N (j) (dB) | Dust on Head (k) |
|---|---|---|---|---|---|---|---|---|---|---|
| Comparison Example 1 | — | 0 | 165 | 3,350 | 2,610 | 0.78 | 1,680 | −0.5 | −3.3 | Present |
| Comparison Example 4 | Sodium oleate | 3 | 185 | 3,510 | 2,800 | 0.80 | 1,770 | 4.5 | 0.6 | Slight amount |
| Example 6 | Sodium oleate | 10 | 210 | 4,200 | 3,570 | 0.85 | 1,820 | 8.4 | 1.0 | None |
| Example 3 | Sodium oleate | 20 | 245 | 4,460 | 3,840 | 0.86 | 1,830 | 9.2 | 3.8 | None |
| Example 7 | Sodium oleate | 30 | 245 | 4,400 | 3,780 | 0.86 | 1,830 | 9.0 | 3.6 | None |

| | parts |
|---|---|
| diisocyanate; weight average molecular weight: 130,000) | |
| Vinyl Chloride-Vinyl Acetate-Vinyl Alcohol Terpolymer (vinyl chloride : vinyl acetate : vinyl alcohol = 92 : 3 : 5 : (% by weight); degree of polymerization: about 430) | 25 |
| Oleic Acid | 3 |
| Silicone Oil (dimethyl polysiloxane; degree of polymerization: about 60) | 1.5 |
| n-Butyl Acetate | 600 |

After the above-described composition had been dispersed for 24 hours in a ball mill, 20 parts of a polyisocyanate (a 75 wt% solution of an adduct of 3 mols of tolylenediisocyanate and 1 mol of trimethylol propane; (molecular weight: about 760; NCO content: 13.3% by weight) in ethyl acetate; Desmodur L-75 produced by Bayer A.G.) were added thereto and the resulting mixture was subjected to a high speed shearing dispersion for 1 hour to produce a magnetic coating composition.

The resulting magnetic coating composition was filtered through a filter having an average opening size of 3 μm and the composition was applied to a polyethylene terephthalate film having a thickness of 22 μm in a dry thickness of 3 μm.

Then, a magnetic field orientation treatment was carried out for 0.02 second in a direct current magnetic field of 2,500 gausses. After drying at 120° C. for 2 minutes, the coating was subjected to a super calender roll processing. Then, the magnetic recording medium was slit to a width of ½ inch to obtain video tapes. The characteristics of this video tape were evaluated and the results obtained are shown in Table 3 and Table 4. Comparison data where different kinds of surface active The measurements shown in Tables 1 to 4 above were obtained as follows.

(a) Feed Rate: The increase in pressure measured using a pressure gauge when air was introduced into the airtight container. Dimension: mm Hg/minute (b) Apparent Specific Gravity: The resulting ferromagnetic alloy powder was put into a graduated cylinder without compacting and measured. Dimension: g/cm³

(c) Saturation Magnetization: The value obtained by measuring the magnetization of the resulting ferromagnetic alloy powder in an external magnetic field of 5,000 Oe using a VSM-Type III vibration sample type magnetometer, produced by Toei Kogyo Co. Dimension: emu/g (d) Surface Property: Overall reflection at 45°: 45° obtained from the magnetic layer of the resulting magnetic recording medium using a standard glossmeter (AUD-CH-CV Type 3, produced by Suga Shikenki Co.).

(e) Bm: The maximum magnetic flux density obtained by measuring the resulting magnetic layer in an external magnetic field of 5,000 Oe using a VSM-Type III, produced by Toei Kogyo Co. Dimension: Gauss (f) Br: The value obtained by measurement under the same conditions as for Bm. Dimension: Gauss (g) Squareness Ratio: The ratio of Br to Bm.

(h) Coercive Force: The value obtained by measurement under the same conditions as for Bm. Dimension: Oe (i) Reproduction Output: The reproduction output obtained on recording a 5 MHz standard signal at optimum recording current using a Standard Type I VTR (AV-8700, produced by SONY Co.). The value is a relative value based on a CrO$_2$ tape as a control. The recording wavelength on the tape was 2.2 μm. Dimension: Decibel (j) C/N: The ratio of modulation noise reproduced at 5±1 MHz to sensitivity, where a 5 MHz standard signal was recorded under the same conditions as for reproduction output. This ratio corresponds to S/N. Dimension: Decibel (k) After a tape having a length of 100 m was run 100 times at 5.0 m/sec using a tape recorder equipped with a fixed dummy head in contact with the surface of the magnetic layer with a contact length of 2 mm, dust adhered to the head was measured visually.

It can be seen from the results in Table 1 that the surface oxidation stabilizing processing should be carried out at an air feed rate of below 20 mm Hg/min, and preferably below 10 mm Hg/min, in order to obtain magnetic recording media which are stable in the atmosphere and have large saturation magnetization. Comparison Example B burned because the air feed rate was too fast.

It can be seen from the results in Table 2 that the surface oxidation stabilizing processing is preferably carried out at an apparent specific gravity of below 1.0 g/cm$^3$ and preferably below 0.5 g/cm$^3$. The reduction in saturation magnetization for Comparison Examples C and D is believed to have occurred because oxidation occurred after the sample was taken out into the atmosphere.

As can be seen from the results in Table 3, a marked aggregation occurred in the magnetic coating composition obtained using the low vacuum evaporation process ferromagnetic alloy powder which had not been processed with an anionic surface active agent and, consequently, magnetic tapes having a good surface property cannot be obtained. Further, the squareness ratio was low because of aggregation and, consequently, neither the reproduction output nor the C/N is satisfactory and the head becomes dirty.

However, the above-described defects have been greatly minimized by using the low vacuum evaporation process ferromagnetic alloy which was processed with an anionic surface active agent, and, consequently, magnetic tapes having a good surface property and high Bm, Br, squareness ratio and coercive force have been obtained. Thus, the reproduction output is high and the noise is low. Dust on the head was improved, because of the good compatibility of the ferromagnetic alloy powder with the binder.

Table 4 shows results obtained by varying the amount of sodium oleate which is the most effective anionic surface active agent. From the results in this table, it can be seen that a preferred amount of the anionic surface active agent is above 1% by weight and preferably about 13% by weight based on the low vacuum evaporation process ferromagnetic alloy powder. It can also be seen that characteristics do not change even though the amount of the anionic surface active agent is above 3% by weight.

Since the effect of the anionic surface active agent does not change when the amount of the anionic surface active agent is increased, a preferred amount of the anionic surface active agent is below 10% by weight, considering efficiency.

It can be understood from the above that video tapes having high quality using a low vacuum evaporation process ferromagnetic alloy powder can be obtained for the first time using the present invention.

While the invention has been described in detail and with reference to specific embodiments thereof, it will be apparent to one skilled in the art that various changes and modifications can be made therein without departing from the spirit and scope thereof.

What is claimed is:

1. In a magnetic recording medium comprising a non-magnetic support having thereon a magnetic recording layer in which a ferromagnetic powder of excellent stability and dispersibility is dispersed in a binder, the improvement wherein said ferromagnetic powder is a ferromagnetic metal powder produced by a low vacuum evaporation process which comprises vaporizing a ferromagnetic metal, an alloy of at least one ferromagnetic metal and at least one nonmagnetic metal in an inert gas and in a high frequency induction furnace and then condensing the vapor and processed with an aqueous solution containing about 0.03% by weight or more at least one anionic surface active agent which is an alkali metal salt of a saturated or unsaturated aliphatic acid having 11 to 22 carbon atoms, wherein the amount of said anionic surface active agent is about 1 to 10% by weight based on the weight of said low vacuum evaporation process ferromagnetic powder wherein the ferromagnetic metal powder is one having an apparent specific gravity of about 1.0 g/m$^3$ or less obtained by introducing air into the induction furnace at a rate of less than about 10 mm Hg/min at about −20° to about 60° C. after vaporization and condensation to restore the pressure in said induction furnace to atmospheric pressure, whereby a thin oxidation layer having a thickness of 5% or less based on the total particle size of the low vacuum evaporation process ferromagnetic metal powder is formed on the surface of the ferromagnetic metal powder to surface oxidation stabilize said ferromagnetic metal powder.

2. The magnetic recording medium as set forth in claim 1, wherein said aqueous solution is a solution of water or a mixture of water and a polar organic solvent in which the water is present in the mixture in an amount of about 50% by weight or more.

3. The magnetic recording medium as set forth in claim 1 or 2, wherein the pH of the aqueous solution of the anionic surface active agent is about 3 to about 9.

4. The magnetic recording medium as set forth in claim 1, wherein the alkali metal salt of the aliphatic acid is sodium oleate or sodium stearate.

5. The magnetic recording medium as set forth in claim 1, wherein the inert gas is a nonoxidizing gas comprising nitrogen, helium, argon or neon.

6. The magnetic recording medium as set forth in claim 5, wherein the pressure of the inert gas is about 0.05 to about 300 mm Hg and the temperature of the inert gas is about −20° to about 60° C.

7. The magnetic recording medium as set forth in claim 1, wherein the frequency of the high-frequency wave used in the induction furnace is about 100 to about 1,000 KHz.

8. The magnetic recording medium as set forth in claim 1, wherein the temperature of the induction furnace during vaporization is about 1,600° C. or more.

9. The magnetic recording medium as set forth in claim 1, wherein the ferromagnetic metal powder is subjected to a magnetic field orientation in a magnetic field of about 100 Oe or more during condensation of the metal vapor.

10. The magnetic recording medium as set forth in claim 1 wherein the particle size of the low vacuum evaporation process ferromagnetic metal powder is about 50 to about 1,000 Å.

11. The magnetic recording medium as set forth in claim 1, wherein about 80% by weight or more of the metal of the low vacuum evaporation process ferromagnetic metal powder is at least one of iron, nickel and cobalt.

12. The magnetic recording medium as set forth in claim 11, wherein about 20% by weight or less of the metal in the low vacuum evaporation process ferromagnetic metal powder is at least one of zinc, aluminum, copper, tin, manganese, chromium and molybdenum.

13. The magnetic recording medium as set forth in claim 1, wherein an amount of the binder is about 10 to about 40 parts by weight based on 100 parts by weight of the ferromagnetic metal powder.

14. The magnetic recording medium as set forth in claim 1 or 13, wherein the magnetic recording layer contains a dispersing agent in an amount of about 0.5 to 20 parts by weight based on 100 parts by weight of the binder.

15. The magnetic recording medium as set forth in claim 1 or 13, wherein the magnetic recording layer contains a lubricating agent in an amount of about 0.2 to 20 parts by weight based on 100 parts by weight of the binder.

16. The magnetic recording medium as set forth in claim 1 or 13, wherein the magnetic recording layer contains an abrasive having a Mohs' hardness of about 5 or more and an average particle size of about 0.05 to 5 $\mu$m in an amount of about 0.5 to 20 parts by weight based on 100 parts by weight of the binder.

17. The magnetic recording medium as set forth in claim 1 or 13, wherein the magnetic recording layer contains an electrically conductive finely divided powder as an antistatic agent in an amount of about 0.2 to 20 parts by weight based on 100 parts by weight of the binder.

18. The magnetic recording medium as set forth in claim 1 or 13, wherein the magnetic recording layer contains a surface active agent in an amount of about 0.1 to 10 parts by weight based on 100 parts by weight of the binder.

19. The magnetic recording medium as set forth in claim 1, wherein the dry thickness of the magnetic recording layer is about 2 to about 50 $\mu$m.

* * * * *